United States Patent [19]

Robertson et al.

[11] Patent Number: 4,836,726
[45] Date of Patent: Jun. 6, 1989

[54] VEHICLE WHEEL CHOCK FOR SECURING VEHICLES DURING TRANSPORT

[75] Inventors: James C. Robertson; William R. Baker, both of Lawrenceville, Ga.

[73] Assignee: Thrall Car Manufacturing Company, Chicago Heights, Ill.

[21] Appl. No.: 213,188

[22] Filed: Jun. 29, 1988

[51] Int. Cl.$^4$ .............. B61D 3/18; B60P 3/07
[52] U.S. Cl. ........................ 410/9; 410/10; 410/20; 410/30
[58] Field of Search ............... 410/4, 7–12, 410/16, 19, 20, 30

[56] References Cited
U.S. PATENT DOCUMENTS

| | | | |
|---|---|---|---|
| 3,374,008 | 3/1968 | Blunden et al. | 410/12 |
| 3,564,577 | 2/1971 | Blunden et al. | 410/12 |
| 3,566,803 | 3/1971 | Blunden et al. | 410/11 |
| 3,673,969 | 7/1972 | Peisner | 410/12 |
| 4,668,140 | 5/1987 | Blunden | 410/10 |
| 4,674,929 | 6/1987 | Blunden | 410/30 |
| 4,679,974 | 7/1987 | Blunden | 410/30 |
| 4,786,223 | 11/1988 | Crissy et al. | 410/20 |

Primary Examiner—Johnny D. Cherry
Assistant Examiner—Dean J. Kramer
Attorney, Agent, or Firm—Marshall, O'Toole, Gerstein, Murray & Bicknell

[57] ABSTRACT

A chock block for a vehicle transported on a deck to secure the vehicle against longitudinal movement; the chock block having a first member and a longitudinal second member lateral to the first member; the first member nesting with a track on the deck and removable from such nesting by upward displacement; the second member extending along and terminating beyond the tread face of a vehicle tire; a pin on the chock block for removably securing the first member to the track to prevent the chock block from horizontal and upward movement; the second member having a longitudinal center when viewed from the top; the chock block being essentially symmetrical about the second member longitudinal center; and the pin having a handle observable and manually operable from both sides of the second member longitudinal center to withdraw the pin forward end from a track hole to remove the chock block from the track and to help position the pin forward end in a track hole.

18 Claims, 5 Drawing Sheets

VEHICLE WHEEL CHOCK FOR SECURING VEHICLES DURING TRANSPORT

This invention relates to railroad cars, over-the-highway trucks and trailers, containers, ships, barges and boats and air cargo planes used to transport vehicles such as automobiles and trucks. More particularly, this invention is concerned with improved chock block apparatus for securing vehicles being transported on or in such equipment.

BACKGROUND OF THE INVENTION

Special railroad cars are used to transport vehicles such as automobiles and trucks from manufacturing plants to distribution centers. Such railroad cars are often referred to as auto rack cars. The number of decks which support the vehicles depends on the type of vehicles to be transported. Although some cars have a single deck it is more common to have two or three decks. Each deck will usually carry about four to six vehicles in the United States.

It is necessary to tie down or secure each vehicle to its supporting deck so that it remains in position while the railroad car moves from its point of loading to its destination. The system used to tie down each vehicle must be able to hold it securely even when the railroad car is subjected to buff and draft forces as well as when it rocks, rolls and bumps.

One of the ways widely used in the United States to tie down vehicles requires a pair of parallel tracks, spaced apart about forty inches outside, on each deck. The four wheels of each vehicle span the tracks and thus provide centering guides when the vehicles are driven onto the railroad car in column formation in so-called circus loading. After a vehicle is properly positioned on a deck it is pulled down tightly by use of four chains. Two chains are used at each end. Each chain free end is hooked to the vehicle frame or body adjacent the track. The chain extends downwardly to a carriage releasably slidable in the track and carrying a winch for tightening the chain. Such apparatus is disclosed in the U.S. Pat. Nos. 3,566,803; 3,564,577; 3,374,008 and 3,673,969.

Although the described tie down apparatus has been successfully used for many years, recent vehicle structural changes have lowered road clearance, indicating that alternative systems should be used. Thus, it is no longer desirable to use a tie down system which pulls the body down and compresses the vehicle springs because this lowers the clearance between the vehicle underbody parts including mufflers, tailpipes and the like, and the deck. When the railroad car bumps and pitches, it can hit the deck and cause damage to the vehicle. Also important is the fact that such tie down systems introduce point loads into the underframe, which is very undesirable. Additionally, to withstand the tension applied to the underbody of the vehicle where the hooks are attached, special reinforcement must be added with increased cost solely to transport the vehicle and with no general benefit to the vehicle once it reaches its destination.

A further disadvantage of the prior art tie down system is that the laborer must have access to both sides of the vehicle; thus, space must be provided for him to work and walk on both sides. For some vehicles it is considered that tie down on one side only would be adequate if a suitable system is available. This would reduce the laborers time and lower costs.

Although the above discussion has pertained specifically to transporting vehicles on railroad cars, it is also common to transport vehicles on over-the-highway trailers and trucks, on ships, barges and boats, by air cargo planes, and in shipping containers. As to shipping containers, automobiles are very often shipped in them by railroad and ship. Thus, servicemen, such as Army and Navy personnel being transferred to and from a base overseas, take their automobiles along and in such cases the automobiles are often transported in containers. When a vehicle is shipped in a container or by trailer, truck, ship, barge, boat or air cargo plane, it is often desirable, and many times necessary, to have a tie down apparatus secure the vehicle in place.

During the last few years several United States patents have been granted for chock blocks which avoid use of a tie-down mechanism which requires attachment to the vehicle chassis, frame or axle. Thus, U.S. Pat. Nos. 4,688,140; 4,674,929 and 4,679,974 disclose chock blocks which are placed beneath one or more tires to secure the vehicle in place. These chock blocks are secured to one or more tracks, secured to a supporting deck, located along the outside of the vehicle wheels. An optional tie-down strap can extend over the tire and be connected to a chock block adjacent to, and fore and aft of, the tire tread. This permits the vehicle suspension to absorb vertical shocks whereas previous systems which tied to the chassis only permitted the tires to absorb vertical shocks.

A chock block of the general type just described which has found substantial commercial acceptance is marketed by Thrall Car Manufacturing Company under the name Wedge Chock. The chock block is disclosed in copending patent application Ser. No. 165,845 filed Mar. 9, 1988, the entire contents of which is incorporated herein by reference. The chock block disclosed in that application is asymmetrical and the chock blocks positioned against opposing portions of a tire tread are mirror images of each other. This requires the manufacture of two separate chock blocks with each one having a locking pin, which engages a hole in the track, positioned on each chock block away from the tire tread so that it is accessible for manual operation. They cannot be interchanged because that would position the locking pin handle adjacent the tire tread and make it inaccessible. A need accordingly exists for a chock block which is symmetrical, so that only one form need be manufactured and one form inventoried by the user, which is usable fore and aft of a tire tread and which has a manual locking mechanism which can be observed and operated from either of said positions while the chock block presses against the tire tread and is locked or secured to the track.

SUMMARY OF THE INVENTION

According to the invention a chock block is provided for a vehicle transported on a deck to secure the vehicle against longitudinal movement. The chock block has a first member, a longitudinal second member, and means on the first member for removably securing the first member to a track on the deck; the first member being capable of nesting with the track and being quickly removable from such nesting arrangement by upward displacement; the second member being permanently laterally joined to the first member; the second member having a sufficient length to extend along, and terminate beyond, the tread face of a tire of a vehicle located alongside the track; securing means on the chock block for removably securing the first member to the track, when in nesting position therewith, to prevent the first member and chock block from horizontal movement along the track and upward movement from the track; the second member having a longitudinal center when viewed from the top; the securing means being located substantially along the longitudinal center of the second member when viewed from the top; and the securing means being observable and manually operable from opposite sides of the second member longitudinal center.

More specifically, the securing means can include a pin having a forward end which can extend through and into one of a plurality of horizontally disposed spaced apart holes in the track. The pin axis can be located substantially along the longitudinal center of the second member when viewed from the top. Additionally, the pin can have a handle observable and manually operable from both sides of the second member longitudinal center to withdraw the pin forward end from a track hole to remove the chock block from the track and to help position the pin forward end in a track hole.

Desirably, the chock block is essentially symmetrical about the second member longitudinal center so that it can be used on either side of a chocked vehicle tire tread. Also, the opposite sides of each chock block second member can have identical means, such as a hole, to receive a fastener. One of the identical means of a first chock block can have a fastener means connected thereto, for securing a tie-down strap to the fastener, on the side to be spaced farthest from a tire. Furthermore, one of the identical means of a second chock block can have a fastener means connected thereto, for securing a tie-down strap to the fastener, on the side to be spaced farthest from the tire. A tie-down strap can extend over the tire upper portion, means can connect the tie-down strap to the fastener means on the first chock block and means can connect the tie-down strap to the fastener means on the second chock block.

The chock block second member can have a bottom extending for about its length; a pair of walls with lower edges can be joined to the bottom and sloped upwardly toward each other and with the upper edges of the walls joined together; and the walls can have openings which permit manual access to, and observation of, the pin handle means from each side of the second member longitudinal center.

The second member bottom can be a plate and the securing means or pin can be mounted beneath the bottom plate.

The bottom plate can have a longitudinal slot through which the handle means can extend upwards to above the plate, with the handle being slidable in the slot.

Lateral locking slots can be located in the bottom plate in communication with the longitudinal slot from each side thereof and in which the handle means can be positioned to releasably secure the pin in retracted position.

The chock block second member can have first and second ends and the chock block first member can be located between the second member first and second ends. The second member first end can terminate beneath the vehicle and beyond a vehicle tire tread and the lower edges of the pair of plates can be about the same length and terminate at the second end beyond the other side of the tire tread face.

The second member bottom plate can be part of and constitute a top plate for the first member and the first member can include a pair of spaced apart parallel vertical walls, which nest with the track, joined to the lower surface of the bottom plate.

Each of the pair of upwardly sloped plates can have an upward end edge. An end plate, sloped from vertical, having a triangular upper portion can be joined to the end of the bottom plate and to the end edges of the sloped plates. This end plate, if desired, can be integral with one of the pair of upwardly sloped plates.

The second member can be located above the car deck when the first member and the track are in nesting arrangement. The second member can have means, such as legs or supports, on opposite sides of, and separate from and spaced from the first member, which maintain the second member substantially horizontal when upward and downward forces are applied to the second member.

The chock block can be used to chock a vehicle on any suitable deck having a track to which it can be releasably secured. The deck can be located on transportation equipment such as on a highway truck or trailer, railroad car, barge, ship, airplane or even a shipping container.

The first and second members can be fabricated primarily of metal plates or they can be made as separate metal castings and then joined together, or the first and second members can be unitary as an integral metal casting. When formed as a casting the first and second members can constitute a skeleton or open ribbed structure with integral openings for manual gripping and observation of the pin.

DETAILED DESCRIPTION OF THE DRAWINGS

To the extent it is reasonable and practical the same or similar elements or parts which appear in the various views of the drawings will be identified by the same numbers.

Figure 1:
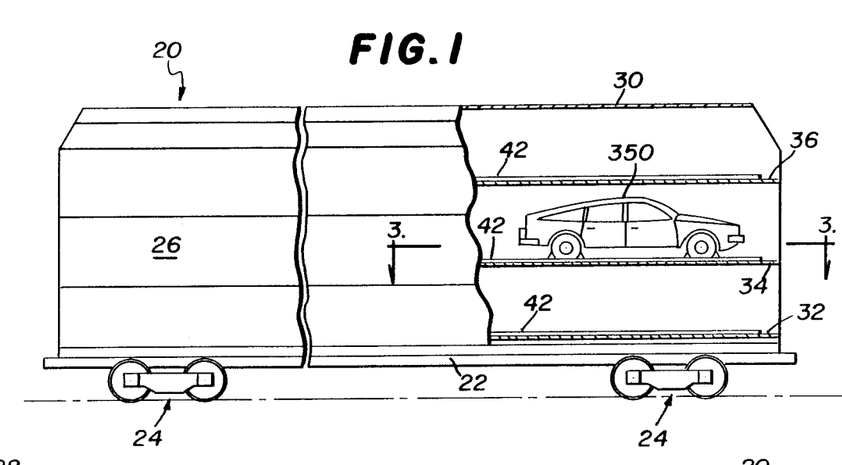
FIG. 1 is a side elevational view of a railroad car having chock block apparatus connected to a track on the car decks according to the invention.
Figure 2:
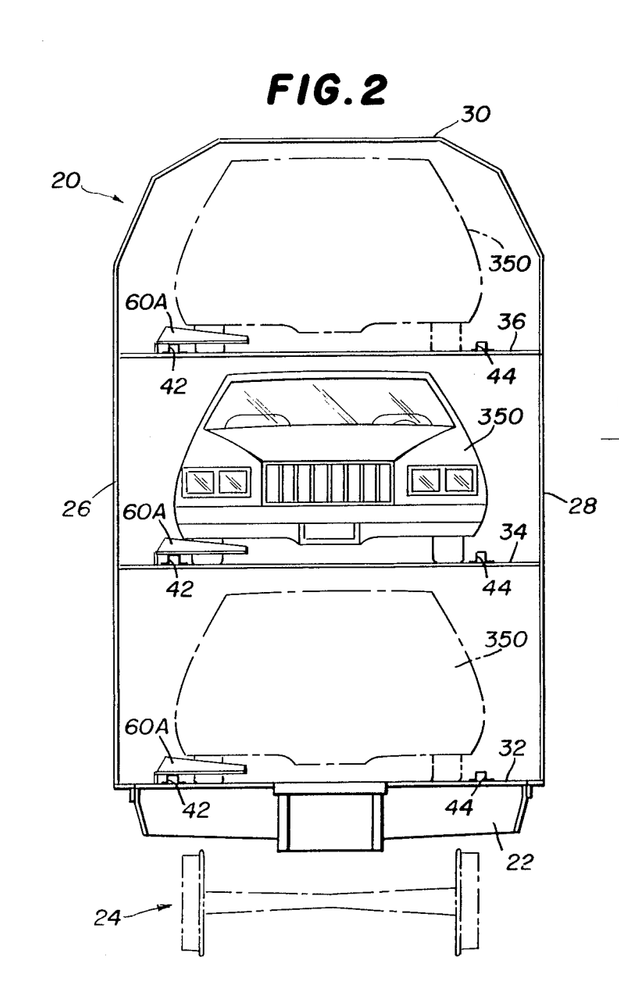
FIG. 2 is an end view of the railroad car shown in FIG. 1.
Figure 3:
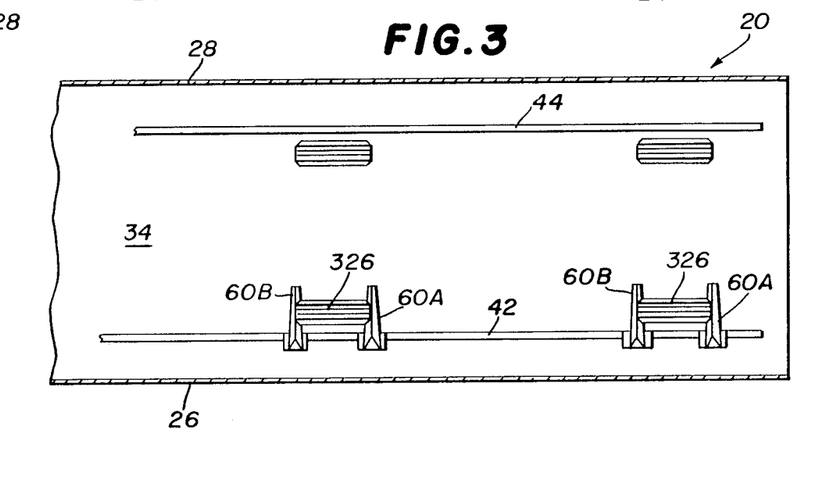
FIG. 3 is a sectional view of FIG. 1 taken along the line 3—3.
Figure 4:
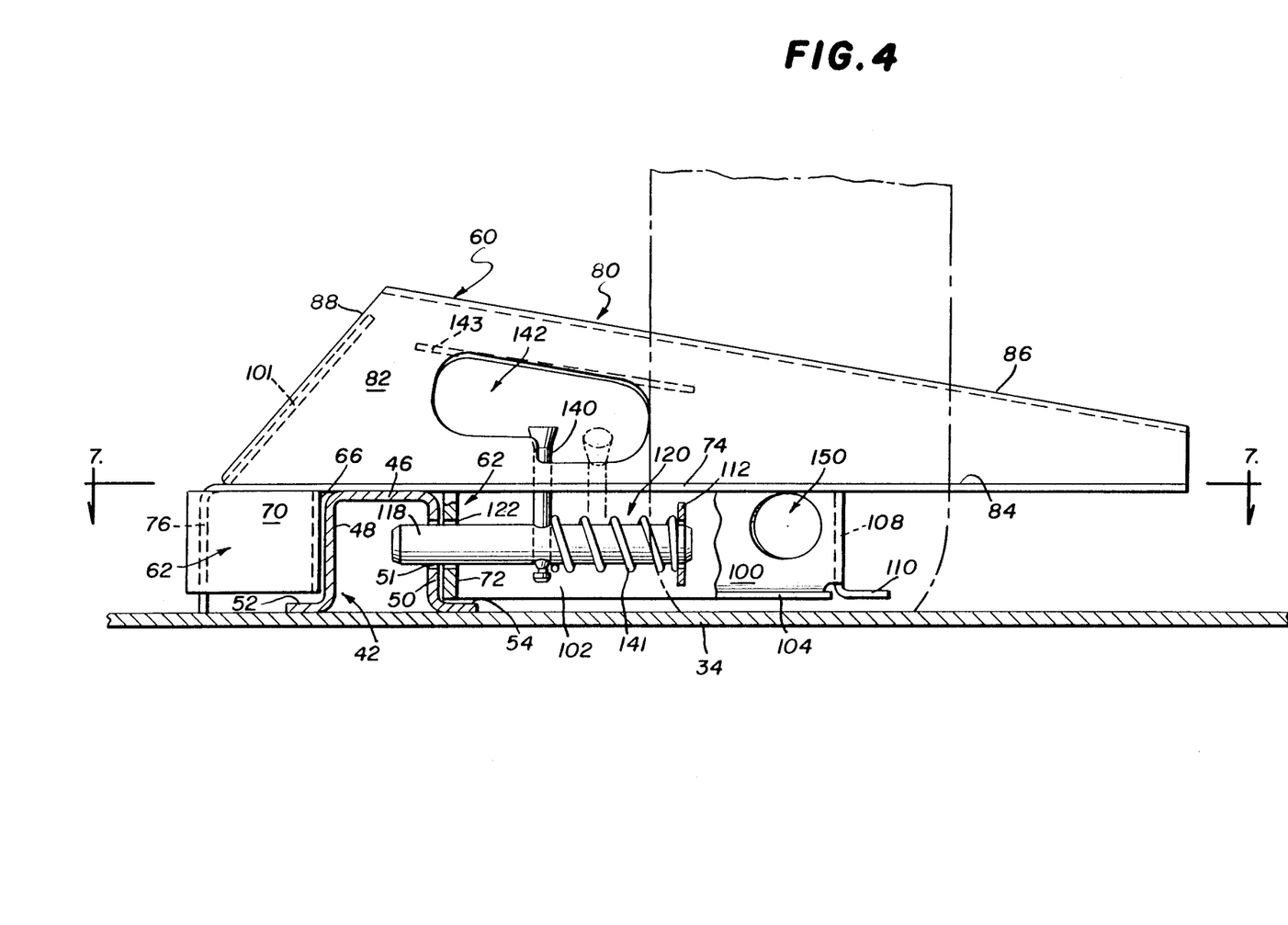
FIG. 4 is a side elevational view of the chock block connected to a track on a railroad car deck and abutting a vehicle tire.
Figure 5:
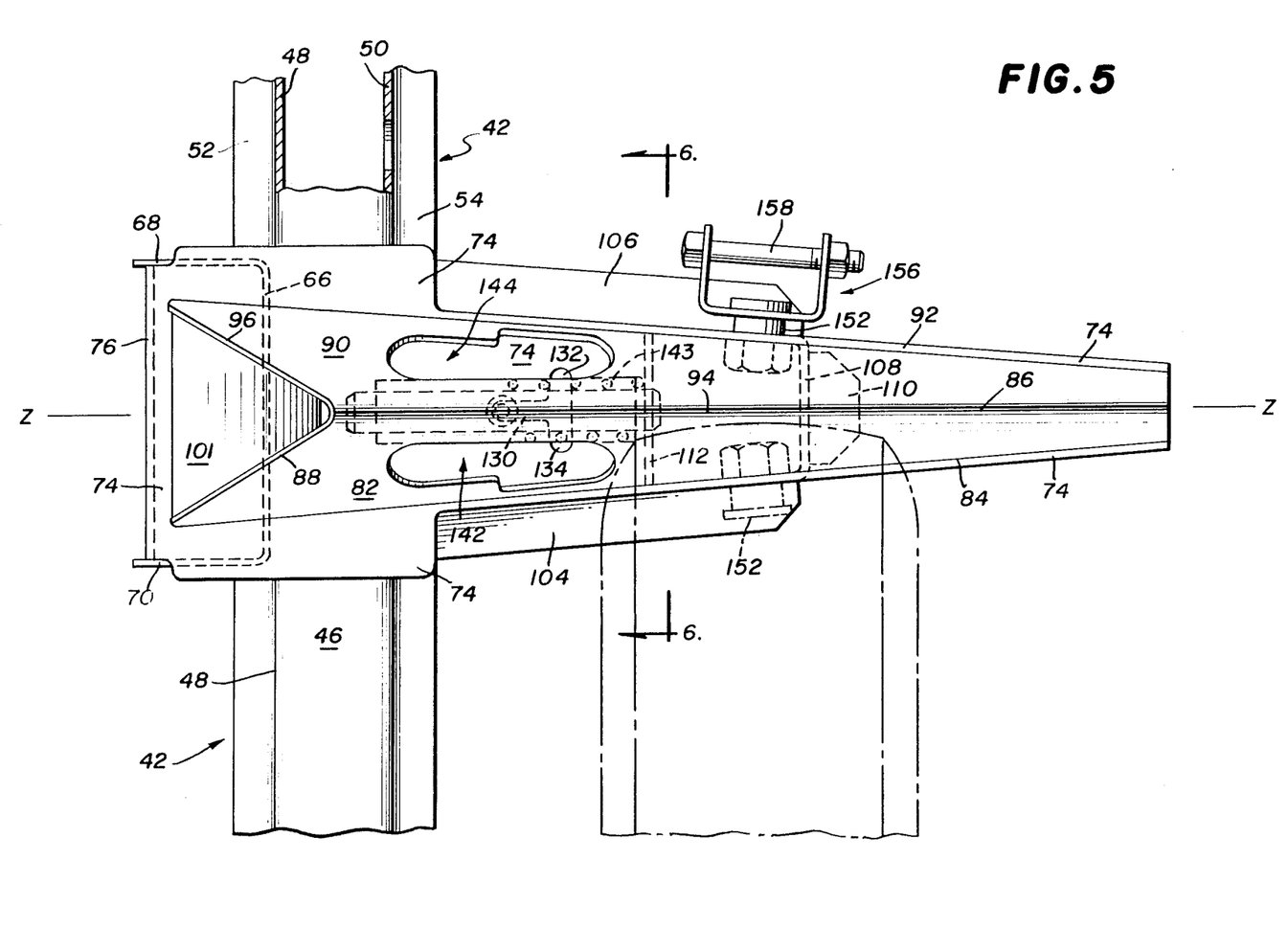
FIG. 5 is a plan view of the chock block shown in FIG. 4.
Figure 6:
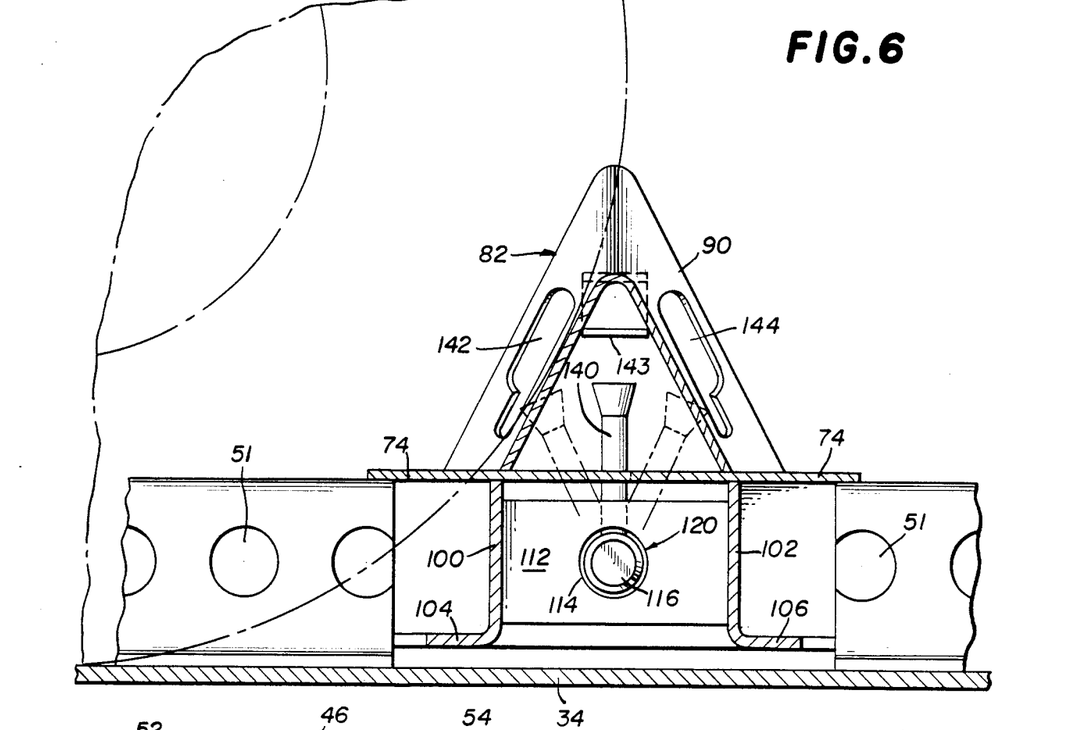
FIG. 6 is a sectional view taken along the line 6—6 of FIG. 4.
Figure 7:
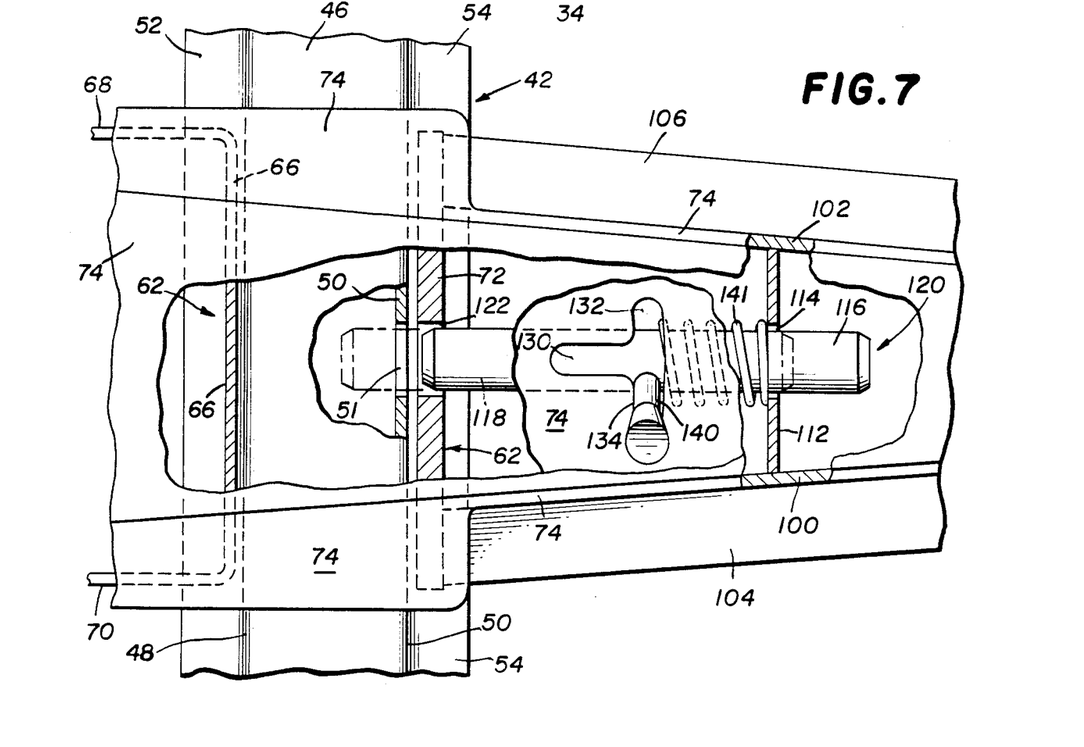
FIG. 7 is a sectional view taken along the line 7—7 of FIG. 4.

With reference to FIGS. 1 to 3, the railroad car 20 has an underframe 22 supported by a pair of wheel trucks 24. Extending upwards from underframe 22 are sidewalls 26,28 to which roof 30 is connected.

The railroad car 20 has three decks 32,34 and 36. Deck 32 is supported on underframe 22 and decks 34 and 36 are supported by column members, not shown, along the sides of the car 20. The height between adjacent decks and between the top deck 36 and the car roof 30 is approximately equal.

Each deck of the railroad car 20 shown in FIGS. 1 to 3 has a pair of identical parallel longitudinal tracks 42,44 spaced apart sufficiently so that the wheels of vehicles 350 can roll in a path between the tracks. Two tracks are to be used when a chock block according to the invention is used to secure a vehicle in position at all four tires, whether outside or inside the wheelbase length. However, only one track 42,44 need be installed. If two tracks are installed only one need be used when two or four chock blocks are used to chock two tires on the same vehicle side. With two tracks, four chock blocks can be used to chock two front tires, two rear tires, or one front tire and one diagonally located rear tire. Additionally, with two tracks and four chock blocks a vehicle can be secured in place by using four chock blocks per vehicle with all four chock blocks located between the axles or outside the axles.

Each of tracks 42,44 is a hat-shaped inverted channel in cross-section. The tracks have a top 46, vertical spaced-apart side walls 48,50 extending downwardly from top 46 and flanges 52,54 projecting outwardly from side walls 48,50 respectively. Flanges 52,54 are joined to the respective car deck, such as deck 34, on which they are located. The side walls 48,50 provide a pair of substantially vertical surfaces which serve to prevent the chock block from swinging about a vertical axis as will be clear from the subject description. Side wall 50 is provided with a plurality of horizontally spaced apart aligned holes 51.

Referring to FIGS. 4 to 7, the chock block 60 has two major functioning members which are first member 62 and second member 80. The first member 62 is horizontally located and adapted to nest with tracks 42,44. In the embodiment illustrated by FIGS. 4 to 7, the first member 62 includes the vertical plate 66 which has integral or unitary vertical flanges 68,70 at each end. The first member 62 also includes vertical plate 72. The spaced apart vertical plate 66, flanges 68,70 and vertical plate 72 are all joined at the top to the lower surface of horizontal bottom plate 74 which constitutes a bottom for the second member 80. Since the plates 66, flanges 68,70 and plate 72 are joined to plate 74, the portion of plate 74 connected thereto may also be considered to be part of the first member 62. The first member 62 nests over track 42 in that the plates 66,72, which are parallel to each other, are positioned close to but slightly outwardly of the parallel outer vertical surfaces of track side walls 48,50. Downward displacement of first member 62 is stopped when plate 74 rests on or contacts track top 46. The horizontal plate 74 has a downwardly projecting vertical flange 76 located between and joined to flanges 68,70. The lower edge of flange 76 projects downwardly below the bottom of flanges 68,70 to be in close contact with deck 34 when the chock block is locked to track 42 when a tie-down strap is applied in tension.

The second member 80 includes the bottom plate 74 to which a first sloped plate 82 and a second sloped plate 90 are joined. Sloped plate 82 is in the general form of a long triangle having a lower edge 84, an upper edge 86 and an end edge 88. Second sloped plate 90 is also in the form of a long triangle having a lower edge 92, an upper edge 94 and an end edge 96. The lower edge 84 of sloped plate 82 is joined to the bottom plate 74. Similarly, the lower edge 92 of sloped plate 90 is joined to bottom plate 74. The upper edges 86,94 are joined together to form a peak at the top of the sloped plates 82,90.

The second member 80 also has an end plate or wall 101. End plate 101 is triangular and is joined to the end edges 88,96 of first and second plates 82,90 respectively, and to the adjoining end of bottom plate 74. If desired, end plate 101 can be made integral with one of the plates 82,90.

A pair of identical spaced apart vertical side walls 100,102 are joined to the bottom of plate 74 and to the vertical plate 72. The wall 100 has an outwardly extending horizontal flange 104 and the wall 102 has an outwardly extending horizontal flange 106. The side walls 100,102 extend to and are joined to vertical end wall 108, the top of which is joined to the bottom of plate 74. The end wall 108 has an outwardly extending horizontal flange 110. The flange 110 limits downward movement of the forward end of the chock block when the flange 110 contacts deck 34. The same function is achieved by flanges 104,106 if flange 110 falls over a deck depression. Similarly, when the lower edge of plate 76 contacts deck 34 the rear end of the chock block is prevented from moving downwardly.

A vertical plate 112 extends between and is joined to side walls 100,102. Plate 112 contains a hole 114 which slidably receives the rear end 116 of pin 120. The front end 118 of pin 120 is received in and slidably supported by hole 122. The front end 118 of pin 120 is sized to be received in the holes 51 in track 42.

An elongated slot 130 is provided in plate 74 so as to be coaxial with pin 120. A pair of lateral slots 132,134 are also provided in plate 74 so as to communicate with slot 130. The slots 132,134 are opposite each other and are sized to receive the pin handle 140, which extends above plate 74, so as to retain the pin in retracted position when the chock block is not locked to track 42. When the handle 140 is moved into alignment with slot 130 it is pushed forward by coil compression spring 141 into a hole 51 in track 42. The coil spring 141 surrounds the pin 120 and extends from handle 140 to plate 112. Coil compression spring 141 forces pin 120 forward for a distance slightly less than the horizontal length of slot 130 due to the diameter of the handle. With the pin in forward position and located in a hole 51 in track wall 50 the chock block is prevented from movement about a horizontal or vertical axis, and is prevented from sliding on the track.

Manual access to, and observation of, the handle 140 is readily obtained through openings 142,144 in the plate 82,90 respectively. In this way, access to the handle, as well as observation of it, can be obtained regardless of whether the chock block is positioned fore or aft of a tire tread. A substantially horizontal reinforcing plate 143 is located along the top edge of openings 142,144 and spans the distance between plates 82,90.

When the chock block 60 is in locked position it is positioned to be in contact with or very close to the tire to limit movement of the vehicle 350. To remove the chock block 60 from locked position on the track 42 the pin handle 140 is pulled back to the end of slot 130 thereby compressing spring 141. The handle 140 is then moved laterally into the most convenient one of the two slots 132,134. This automatically keeps the pin 120 in retracted position with the pin forward end 118 recessed in plate 72, thereby preventing it from obstructing removal of the chock block 60 from, and installing it on, the track. When a vehicle is positioned on the deck and is ready to be secured in place, the chock block 60 is positioned so that the first member 62 nests on a track 42,44 a short distance away from the tire. Then the chock block 60 is slid against the tire and handle 140 released so that pin 120 can be moved into the closest available hole 51 in the track.

The chock block 60 as described is symmetrical about the longitudinal center line Z—Z (FIG. 5) as is the first member 62 and the second members 80 when viewed along the same line. This permits manufacture of a single chock block which can be used fore or aft of the same tire tread without any modification.

Each of the side walls 100,102 is provided with a hole 150 of identical size, shape and location and which is adapted to receive a stud bolt 152 or other suitable fastener means. This permits the chock block to be used with a tie-down strap extending over a tire and which is connected to a chock block located on each fore and aft side of the same tire.

Figure 8:
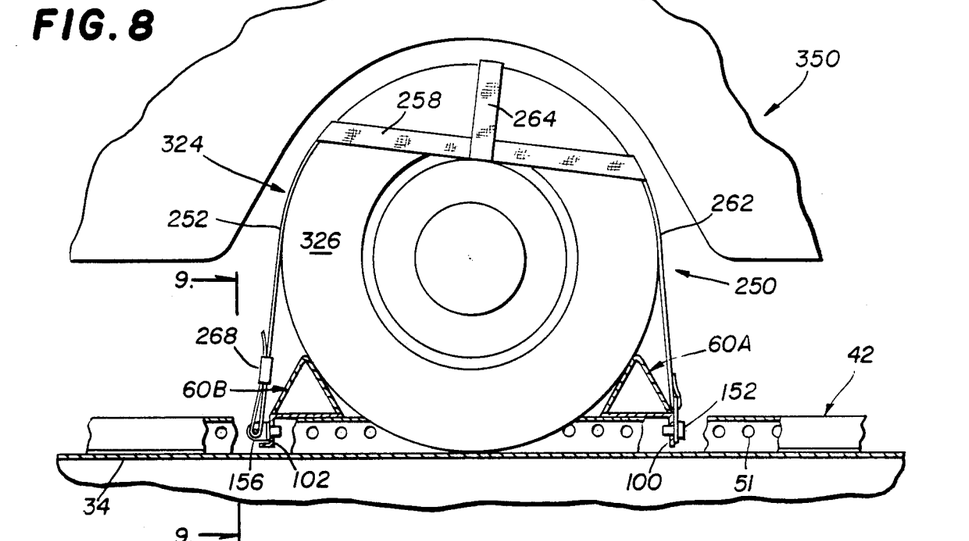
FIG. 8 is a side elevational view of a vehicle wheel tied down to a deck by use of a pair of chock blocks, one on each side of the wheel tire tread, and a tie-down strap run over the tire upper portion and connected at each end to one of the chock blocks.
Figure 9:
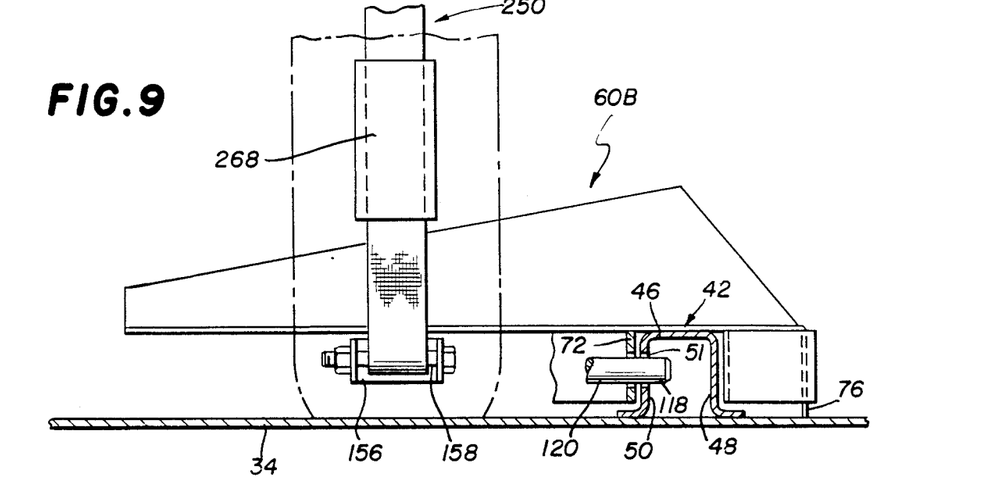
FIG. 9 is a side elevational view, partially in section, taken along the line 9—9 of FIG. 8.
Figure 10:
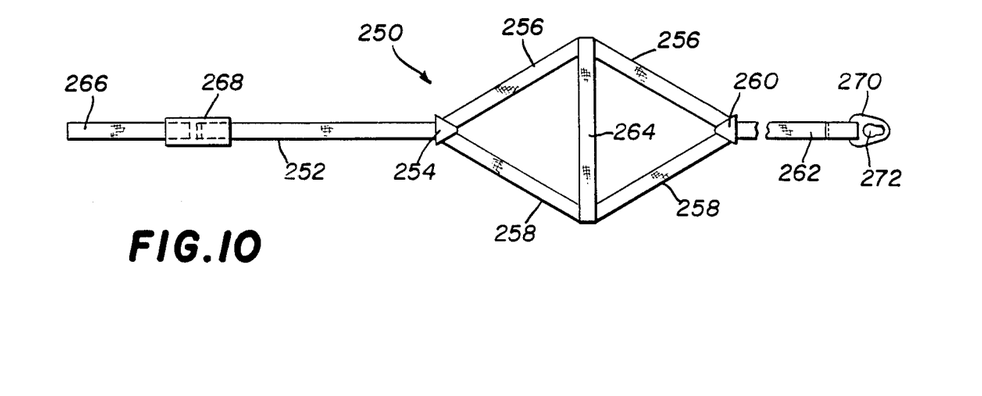
FIG. 10 is a plan view of the tie-down strap used in combination with the chock blocks shown in FIGS. 8 and 9.

FIGS. 8 to 10 illustrate the use of the symmetrical chock block of this invention in combination with a tie-down strap to prevent horizontal and vertical movement of a vehicle tire.

A chock block 60 can be provided on the right side of longitudinal center line Z—Z (FIG. 5) with a stud bolt 152 in hole 150 on the right side. The hole 150 on the left side remains empty and as so equipped it is referred to as chock block 60A. Another chock block 60 can be provided on the left side of longitudinal center line Z—Z with a tie-down strap bracket 156 which is secured in place by stud bolt 152 in hole 150 on the left side. The hole on the right side remains empty. A chock block so equipped is referred to as chock block 60B.

As shown in FIG. 8, one chock block 60A can be placed on the right side of vehicle wheel 324 adjacent the tread face of tire 326 and a chock block 60B can be placed on the left side of the same wheel adjacent the tread face of tire 326. After the chock blocks 60A and 60B are positioned on track 42 adjacent the tread of tire 326 the chock blocks are secured in place on the track by means of pin 120 which enters a hole 51.

The tie-down strap 250 (FIGS. 8 to 10) has a straight section 252, a pair of outwardly branching and then inwardly converging portions 256,258 which extend from juncture 254 on straight section 252 to juncture 260 on straight section 262, and a lateral section 264 having its ends joined to the middle of each branching portion 256,258. The end 266 of straight section 252 is permanently connected to a pin 158 on bracket 156. A conventional winch 268 can be mounted on strap straight section 262 inward from the end so as to leave enough of a strap portion free end 266 to be passed under pin 158 on chock block 60B and then into the winch 268 to secure the strap to the chock block and permit use of the winch to tighten the strap and thereby put the strap in tension and pull the tire down.

The end of the straight section 262 is permanently attached to a flat metal plate 270 which has a key hole shaped opening 272 which permits it to be removably placed on the end of stud 152 in a conventional manner.

Once the chock blocks 60A,60B are put in position against opposing tread sides of the tire 326, the tie-down strap 250 is run over the top of the tire and positioned with branch 258 on the outer top side of the tire and branch 256 on the inner top side of the tire. This places the strap lateral section 264 approximately on top of the tire but located laterally or radially of the tire. The strap branch 258 will lie along the front face of the tire and the strap branch 256 will lie along the back face of the tire. The metal plate 270 is then positioned on stud bolt 152 on chock block 60A. The strap free end 266 is passed under pin 158 on chock block 60B and into winch 268. The strap is then tightened by use of the winch.

The pin 120 on each of the chock blocks 60A,60B is located on the second member of each chock block between the second member outer end and the first member of each chock block. As a result, when the tie-down strap 250 is tightened it pulls the second end of each chock block upwardly, but only for a small distance because the pin 120 is thereby moved to the top of track hole 51 and the bottom end of plate 76 is pivoted downwardly against deck 34 (FIG. 4), so that no further vertical or upward movement of the chock block can occur. Also, the chock blocks cannot twist clockwise or counterclockwise when releasably connected to track 34 by pin 120 because the first member 62 nests closely with the track and prevents such movement. The flange 110 prevents the second member outer end from being forced downwardly by pressure of a tire against it even when the chock block is used without a tie-down strap. Accordingly, the chock block of the invention provides excellent stability against movement regardless of the source of any force applied to it and this is achieved without having the chock block occupy much space and without the need for ancillary arms or track engaging members to obtain such stability.

Although FIGS. 8–10 show winch 268 mounted permanently on the tie-down strap, it is also feasible to place the winch permanently on stud bolt 152. The loose or free end 266 of the strap can then be threaded into the winch and tightened by means of the winch.

The foregoing detailed description has been given for clearness of understanding only, and no unnecessary limitations should be understood therefrom, as modifications will be obvious to those skilled in the art.

What is claimed is:

1. Transportation equipment having at least one deck for supporting and transporting four-wheel vehicles such as automobiles and trucks;
   at least one track secured to the deck;
   chock blocks for a vehicle transported on the deck to secure the vehicle against longitudinal movement;
   each chock block having a first member, a longitudinal second member, and means on the first member for removably securing the first member to the track;
   the first member nesting with the track and being quickly removable from such nesting arrangement by upward displacement;
   the second member being permanently laterally joined to the first member;
   the second member having a sufficient length to extend along, and terminate beyond, the tread face of a tire of a vehicle located alongside the track;

securing means on the chock block for removably securing the first member to the track, when in nesting position therewith, to prevent the first member and chock block from horizontal movement along the track and upward movement from the track;

the second member having a longitudinal center when viewed from the top;

the securing means being located substantially along the longitudinal center of the second member when viewed from the top; and the securing means being observable and manually operable from opposite sides of the second member longitudinal center.

2. Transportation equipment having at least one deck for supporting and transporting four-wheel vehicles such as automobiles and trucks;

at least one track secured to the deck;

the track having a pair of substantially upwardly extending spaced apart surfaces;

chock blocks for a vehicle transported on the deck to secure the vehicle against longitudinal movement;

each chock block having a first member and a longitudinal second member;

the first member nesting with the track and being quickly removable from such nesting arrangement by upward displacement;

the second member being substantially horizontally positioned and permanently laterally joined to the first member;

the second member having a sufficient length to extend along, and terminate beyond, the tread face of a tire of a vehicle located alongside the track;

a pin on the chock block for removably securing the first member to the track, when in nesting position therewith, to prevent the first member and chock block from horizontal movement along the track and upward movement from the track;

the pin having a forward end and the first member having a hole into which the pin forward end can extend through and into one of a plurality of horizontally disposed spaced apart holes in the track;

the second member having a longitudinal center when viewed from the top;

the pin having an axis located substantially along the longitudinal center of the second member when viewed from the top; and the pin having handle means observable and manually operable from both sides of the second member longitudinal center to withdraw the pin forward end from the track hole to remove the chock block from the track and to help position the pin forward end in a track hole.

3. Transportation equipment according to claim 2 in which:

the second member has a bottom extending for about its length;

a pair of walls with lower edges joined to the bottom and sloped upwardly toward each other and with the upper edges of the walls joined together; and the walls having openings which permit manual access to, and observation of, the pin handle means from each side of the second member longitudinal center.

4. Transportation equipment according to claim 3 in which:

the second member bottom is a plate; and means slidably mounts the pin beneath the bottom plate.

5. Transportation equipment according to claim 4 in which the bottom plate has a longitudinal slot through which the handle means extends upwards to above the plate and is slidable in the slot.

6. Transportation equipment according to claim 5 in which lateral locking slots in the bottom plate communicate with the longitudinal slot from each side thereof and in which the handle means can be positioned to releasably secure the pin in retracted position.

7. Transportation equipment according to claim 4 in which:

the second member has first and second ends;

the first member is located between the second member first and second ends;

the second member first end terminates beneath the vehicle and beyond a vehicle tire tread; and the lower edges of the pair of plates being about the same length and terminating at the second end beyond the other side of the tire tread face.

8. Transportation equipment according to claim 4 in which:

the second member bottom plate in part constitutes a top plate for the first member; and the first member includes a pair of spaced apart parallel vertical walls, which nest with the track, joined to the lower surface of the bottom plate.

9. Transportation equipment according to claim 3 in which:

each of the pair of upwardly sloped plates has an upward end edge; and an end plate, sloped from vertical, having a triangular upper portion joined to the end of the bottom plate and to the end edges of the sloped plates.

10. Transportation equipment according to claim 2 in which the second member is located above the car deck when the first member and the track are in nesting arrangement.

11. Transportation equipment according to claim 2 in which the second member has means on opposite sides of, and separate from and spaced from the first member, which maintains the second member substantially horizontal when upward and downward forces are applied to the second member.

12. Transportation equipment according to claim 2 in which the chock block is essentially symmetrical about the second member longitudinal center.

13. Transportation equipment according to claim 12 in which:

each chock block second member has opposite sides and each of the sides has identical means to receive a fastener; and one of the identical means which receives a fastener has a fastener means connected thereto for securing a tie-down strap to the fastener.

14. A railroad car having at least one deck for supporting and transporting four-wheel vehicles such as automobiles and trucks;

at least one track secured to the deck;

the track having a pair of substantially upwardly extending spaced apart surfaces;

chock blocks for a vehicle transported on the deck to secure the vehicle against longitudinal movement;

each chock block having a first member and a longitudinal second member;

the first member nesting with the track and being quickly removable from such nesting arrangement by upward displacement;

the second member being substantially horizontally positioned and permanently laterally joined to the first member;

the second member having a sufficient length to extend along, and terminate beyond, the treadface of a tire of a vehicle located alongside the track;

a pin on the chock block for removably securing the first member to the track, when in nesting position therewith, to prevent the first member and chock block from horizontal movement along the track and upward movement from the track;

the pin having a forward end and the first member having a hole into which the pin forward end can extend through and into one of a plurality of horizontally disposed spaced apart holes in the track;

the second member having a longitudinal center when viewed from the top;

the pin having an axis located substantially along the longitudinal center of the second member when viewed from the top;

the pin having handle means observable and manually operable from both sides of the second member longitudinal center to withdraw the pin forward end from the track hole to remove the chock block from the track and to help position the pin forward end in a track hole;

each chock block being essentially symmetrical about the second member longitudinal center;

a first chock block positioned adjoining the tread face at the front of a tire on a wheel of a vehicle on the deck;

a second chock block positioned adjoining the tread face at the rear of the same tire on said wheel; and the first and second chock blocks being removably secured to the track by the respective pin of each chock block.

15. A railroad car according to claim 14 in which:

each chock block second member has opposite sides and each of the sides has identical means to receive a fastener; and one of the identical means of the first chock block has a fastener means connected thereto, for securing a tie-down strap to the fastener, on the side spaced farthest from the tire; and one of the identical means of the second chock block has a fastener means connected thereto, for securing a tie-down strap to the fastener, on the side spaced farthest from the tire.

16. A railroad car according to claim 15 including:

a tie-down strap extending over the tire upper portion;

means connecting the tie-down strap to the fastener means on the first chock block; and means connecting the tie-down strap to the fastener means on the second chock block.

17. A chock block for a vehicle transported on a deck to secure the vehicle against longitudinal movement;

the chock block having a first member, a longitudinal second member, and means on the first member for removably securing the first member to a track on the deck;

the first member being capable of nesting with the track and being quickly removable from such nesting arrangement by upward displacement;

the second member being permanently laterally joined to the first member;

the second member having a sufficient length to extend along, and terminate beyond, the tread face of a tire of a vehicle located alongside the track;

securing means on the chock block for removably securing the first member to the track, when in nesting position therewith, to prevent the first member and chock block from horizontal movement along the track and upward movement from the track;

the second member having a longitudinal center when viewed from the top;

the securing means being located substantially along the longitudinal center of the second member when viewed from the top; and the securing means being observable and manually operable from opposite sides of the second member longitudinal center.

18. A chock block for a vehicle transported on a deck to secure the vehicle against longitudinal movement;

the chock block having a first member and a longitudinal second member;

the first member being capable of nesting with the track and being quickly removable from such nesting arrangement by upward displacement;

the second member being substantially horizontally positioned and permanently laterally joined to the first member;

the second member having a sufficient length to extend along, and terminate beyond, the tread face of a tire of a vehicle located alongside the track;

a pin on the chock block for removably securing the first member to the track, when in nesting position therewith, to prevent the first member and chock block from horizontal movement along the track and upward movement from the track;

the pin having a forward end which can extend through and into one of a plurality of horizontally disposed spaced apart holes in the track;

the second member having a longitudinal center when viewed from the top;

the pin having an axis located substantially along the longitudinal center of the second member when viewed from the top;

the pin having handle means observable and manually operable from both sides of the second member longitudinal center to withdraw the pin forward end from a track hole to remove the chock block from the track and to help position the pin forward end in a track hole; and the chock block being essentially symmetrical about the second member longitudinal center.

* * * * *

UNITED STATES PATENT AND TRADEMARK OFFICE
CERTIFICATE OF CORRECTION

PATENT NO. : 4,836,726

DATED : June 6, 1989

INVENTOR(S) : JAMES CECIL ROBERTSON ET AL

It is certified that error appears in the above-identified patent and that said Letters Patent is hereby corrected as shown below:

Title page, after the list of cited U.S. patent documents, insert -- France 1,469,877 2-1966 410/30 --; column 6, line 40, change "fo" to -- to --; column 11, line 8, change "treadface" to -- tread face --.

Signed and Sealed this

Sixth Day of February, 1990

Attest:

JEFFREY M. SAMUELS

Attesting Officer     Acting Commissioner of Patents and Trademarks